(12) United States Patent
Drescher

(10) Patent No.: US 7,124,121 B1
(45) Date of Patent: Oct. 17, 2006

(54) MULTI-THREADED NAÏVE BAYES ALGORITHM FOR ENTERPRISE-SERVER DATA MINING

(75) Inventor: Gary Drescher, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 596 days.

(21) Appl. No.: 10/337,841

(22) Filed: Jan. 8, 2003

(51) Int. Cl.
*G06F 15/18* (2006.01)

(52) U.S. Cl. .............................. 706/12; 706/14; 706/46
(58) Field of Classification Search .................. 706/12, 706/14, 46; 707/5
See application file for complete search history.

(56) References Cited

U.S. PATENT DOCUMENTS

| | | | |
|---|---|---|---|
| 5,931,900 A * | 8/1999 | Notani et al. ............... | 709/201 |
| 6,067,604 A * | 5/2000 | Ramachandran et al. ... | 711/149 |
| 6,901,398 B1 * | 5/2005 | Horvitz et al. .............. | 707/5 |
| 2001/0000821 A1 * | 5/2001 | Kolodner et al. ........... | 711/170 |
| 2002/0038301 A1 * | 3/2002 | Aridor et al. ............... | 707/10 |
| 2003/0088458 A1 * | 5/2003 | Afeyan et al. ............... | 705/10 |

* cited by examiner

*Primary Examiner*—Joseph P. Hirl
(74) *Attorney, Agent, or Firm*—Bingham McCutchen LLP

(57) ABSTRACT

The present invention provides an efficient method and system for performing data mining on large amounts of data using a multi-threaded Bayesian algorithm. The method for data mining includes receiving data from a database, performing multi-threaded classification on the data using a Naïve Bayes model and performing multi-threaded regression on the data based on a Naïve Bayes model. One of the multi threaded classification and regression steps may include processing the data according to a batch learning system, processing the data according to an incremental learning system, processing the data according to an online learning system, and processing the data according to a distributed learning system. One of the the multi-threaded classification and regression steps may include developing a set of rules from a set of training data. One of the multi-threaded classification and regression steps may comprise arranging the data into a plurality of groups.

12 Claims, 3 Drawing Sheets

Database Management System (DBMS)

MULTI-THREADED NAÏVE BAYES ALGORITHM FOR ENTERPRISE-SERVER DATA MINING

FIELD OF INVENTION

The present invention relates to the field of data mining. More specifically, the present invention relates to a more efficient method and system for performing data mining on large amounts of data using a multi-threaded Naïve Bayes algorithm.

BACKGROUND OF THE INVENTION

As the amount of data expands, the ability to process and comprehend that data becomes more difficult. Patterns and trends are lost in the massive quantities of data stored in databases and data warehouses. As the influx of data increases, the ability to interpret the data also becomes more difficult. Thus, there is a need for a powerful and efficient analytical tool that can process and derive interesting knowledge from the enormous amounts of data available.

Historically, the primary method for analyzing data was to construct well structured hypotheses and test the hypotheses by analyzing data. Today, a method called data mining is one of the new ways of analyzing data. Data mining is an automated process whereby previously unknown relationships among data are discovered. The two main steps of data mining are modeling, and scoring. These two steps are typically performed by a data mining tool.

Generally, modeling is the process of deriving a model or function by analyzing sets of training data. The derived model may be represented in various forms, such as classification rules, decision trees, mathematical formulae, or neural networks. If a model was a rule, for example, the rule could be a set of symptoms that a doctor uses to diagnose a disease. This rule can be derived from a set of patients who had the disease. Once derived, the rule is applied to a larger group of people to assist in determining whether they have that disease. The model that is generated using this training data is then used to make predictions about future patients.

Scoring involves making predictions with the generated model. The score may or may not be augmented with a numerical values that represents the certainty of each prediction. Scores are predictions, and can be present along with associated data, e.g., confidence measures or overall accuracy measures. Currently, there are several methods for scoring with a model. One method of scoring involves using an Open DataBase Connectivity (ODBC) or Structured Query Language (SQL) cursor. The scoring occurs where the model is stored and the scoring results are transmitted from the model's location to the database. In another method, a model may consist of data used by a C, C++ or Java function. The function may be wrapped in an application, which runs against the data stored in the database. However, this option also involves massive data movement and hence, is inefficient.

Performance-wise these are not efficient options because they involve a lot of data movement across the database to the mining tool's location. Further, many models are unusable because the execution time required is too large to process the data. Thus, there is a need for a more efficient data mining system and method.

SUMMARY OF THE INVENTION

An object of the present invention is to reduce data movement and increase the efficiency of the data mining process.

Another object of the present invention is to lower the transfer of data and as a result reduce the data transfer cost.

Another object of the present invention is to perform both classification and regression.

Another object of the present invention is to incorporate a multi-threaded implementation of the Naïve Bayes learning algorithm into an enterprise server to perform data mining on large amounts of data.

Another object of the present invention is to support rapid pre-processing before passing training data to other modules.

Another object of the present invention is to support batch learning, incremental learning, online learning, and distributed learning.

The present invention achieves the above and other objects using a data mining server, comprising: a database containing data; a database engine operatively connected to process the data; a multi-threaded classification system, the classification system using the data to perform classification based on a Naïve Bayes model; and a multi-threaded regression system, the regression system using the data to perform regression based on a Naïve Bayes model.

Other and further objects of the present invention will be apparent from the following description and claims and are illustrated in the accompanying drawings, which by way of illustration, show preferred embodiments of the present invention. Other embodiments of the invention embodying the same or equivalent principles may be used and structural changes may be made as desired by those skilled in art without departing from the present invention and the purview of the appended claims.

The details of the present invention, both as to its structure and operation can best be understood by referring to the accompanying drawings.

DETAILED DESCRIPTION

Figure 1:
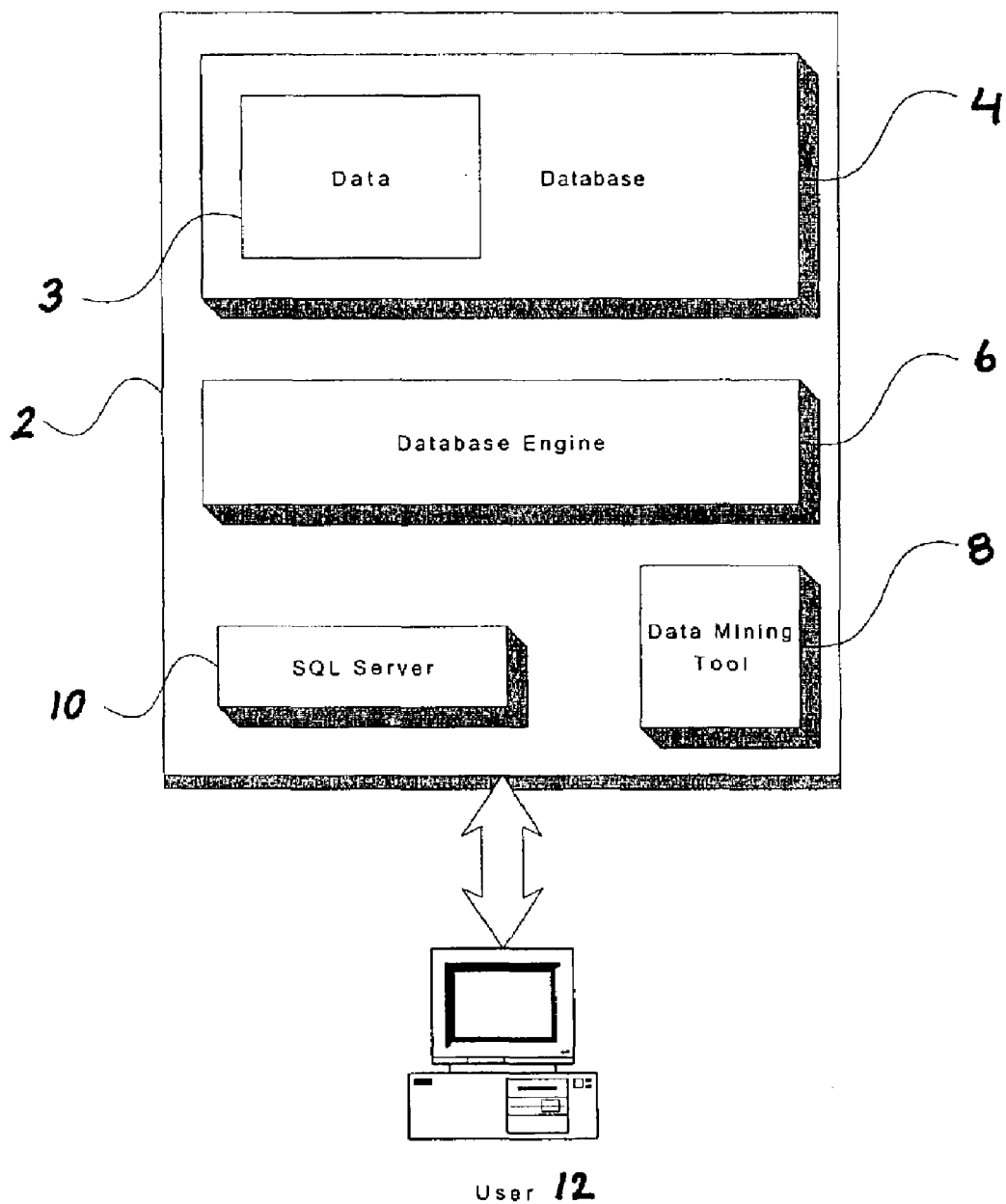
FIG. 1 is a logical block diagram of a database management system (DBMS).
Figure 2:
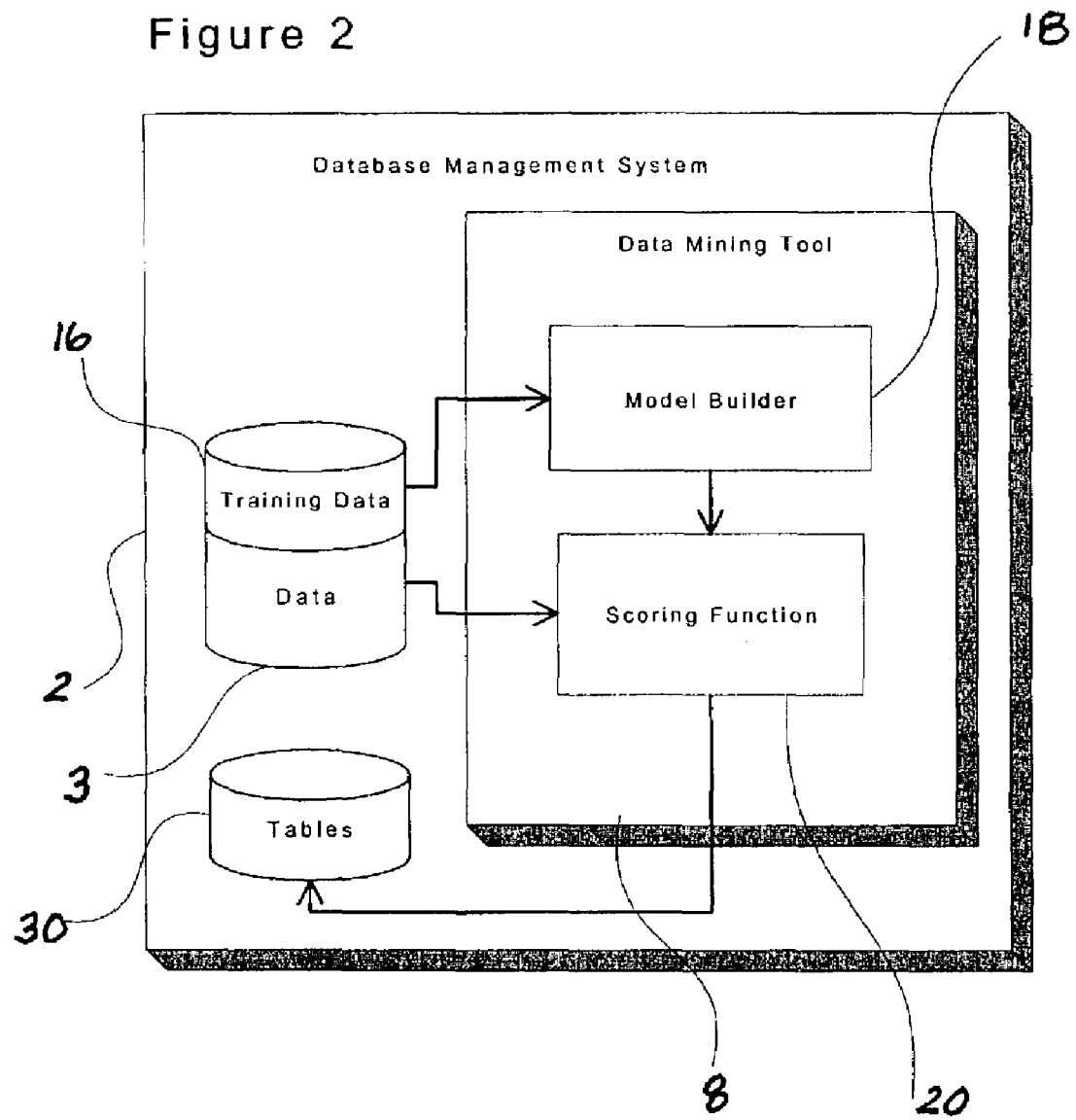
FIG. 2 is a logical block diagram of a database management system (DBMS) that shows further details of the data mining tool.
Figure 3:
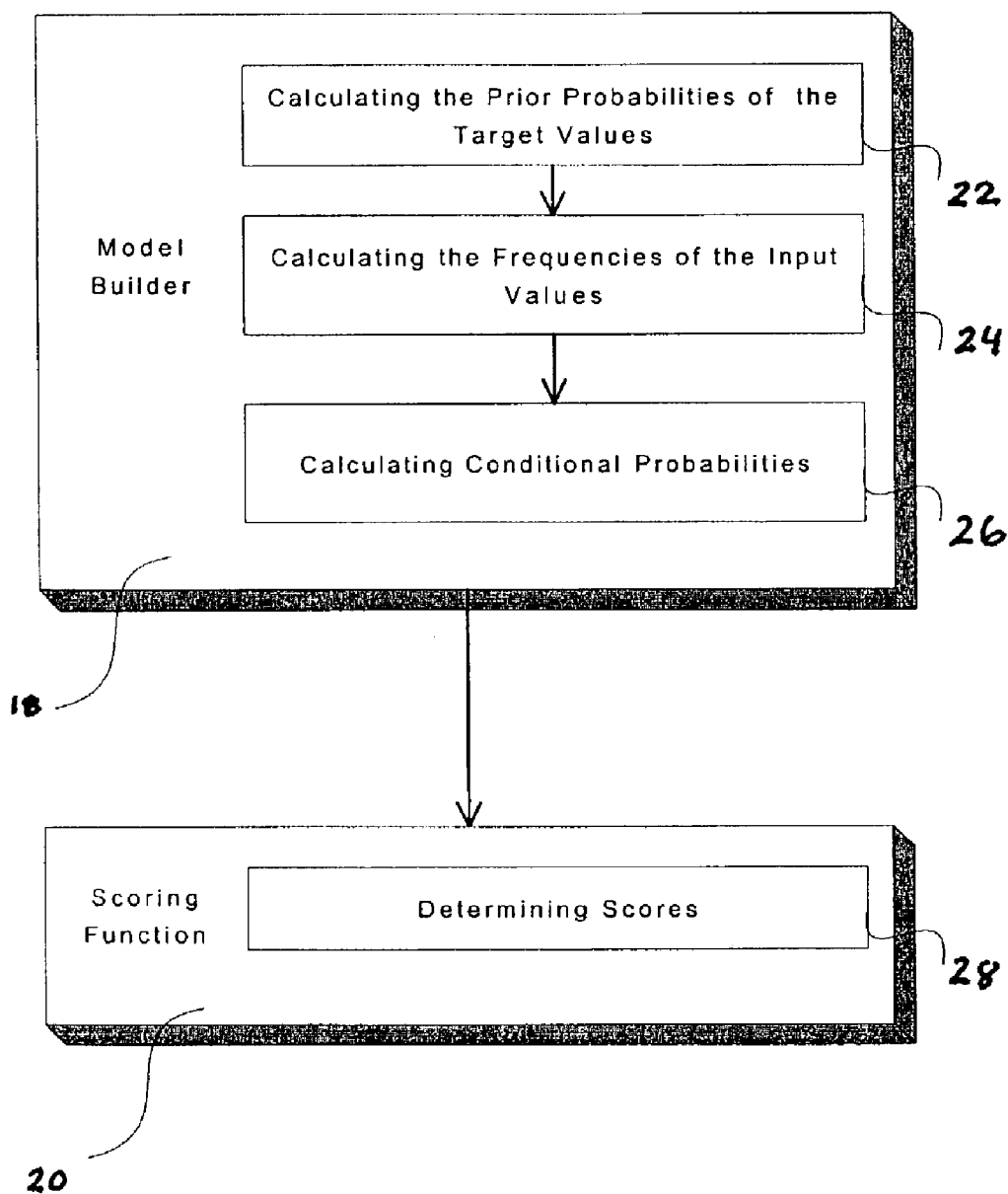
FIG. 3 is a flow diagram showing the processes of the model builder and the scoring function.

Referring to FIGS. 1 through 3, the present invention is described in detail below. The present invention is a method and system for data mining that incorporates a multi-threaded implementation of the Naïve Bayes learning algorithm into an enterprise server to perform data mining on large amounts of data. These steps are performed in the database management system (DBMS) 2, as opposed to an outside data mining server.

Referring to FIG. 1, a database 4 is a compilation of data 3 organized so that a computer program can find and access desired pieces of data 3. Databases 4 may be organized using fields, records, and files. A field is a piece of information or data 3. A record is a collection of fields. A file is a set of records. Fields can hold many different structured data 3 types, such as integers, character strings, money, dates, and binary large objects.

A database management system DBMS 2 is used to access and organize the data 3 stored in the database 4. A DBMS 2 includes software programs that allow a user 12 to access and organize data 3. In the DBMS 2, a database engine 6 stores, organizes and retrieves data 3. Many types of DBMS's 2 are available. DBMS's 2 may be relational, network, flat, and hierarchical. These terms refer to the method of organizing data 3 within the database 4. These methods have varying effectiveness and flexibility with regards to data extraction. Any type of DBMS 2 is appropriate for the present the invention. However, the preferred type of DBMS 3 is a relational DBMS 2 (RDBMS). A relational DBMS 2 maintains data in related tables. RDBMS involve few assumptions about the relationship of data 3 or the method of data extraction. A key feature of relational systems is that one database 4 can be spread across several tables. Examples of relational databases 4 include ORACLE'S 8i®.

A data mining tool 8, as shown in FIG. 1, is a system tool that derives patterns and relationships from data 3. Often these patterns and relationships are unknown. Although the data mining tool 8 is shown as separate block in FIG. 2, it is typically part of the functionality of the server 10 and the database engine 6. The data mining tool 8 performs two steps: modeling, and scoring. Referring to FIG. 2, model building is executed by the model builder 18 and scoring is executed by the scoring function 20.

Generally, modeling is the process of developing a model from training data 16. Training data 16 is a discrete set of data 3 that is typically collected from operational databases. For example, if building a model for churn analysis, the training data is taken from a customer database. The model is used to examine new sets of data 3 in the scoring process. Basically, scoring is the process of applying the model to a new case 3 to make predictions (i.e. scores). The numerical value of the score represents the certainty of each prediction.

In the present invention, Bayesian theory is used to build models. Bayesian theory is a mathematical theory that governs the process of logical inference; it assists in determining what degree of confidence to have of several possible conclusions. Naïve-Bayes is a classification technique that uses Bayesian theory. Naïve-Bayes efficiency and simplicity allows it to be used for modeling and scoring. For example, Naïve-Bayes can generate a model after analyzing a data 3 set once. Naïve Bayes is also a very efficient technique with respect to creating models and making predictions from partial data 3. The model builder 18 utilizes Naïve Bayes to build models. Though the present invention uses Naïve Bayes to build models, other classification algorithms are also present in the data mining system. These algorithms can be used when deemed appropriate by those skilled in the art.

Naïve Bayes Algorithm (NBA) makes predictions using Bayes' Theorem, which provides an equation for deriving the probability of a prediction based on a set of underlying evidence. The NBA module makes a simplifying assumption that the pieces of evidence are not interrelated in a particular way. This assumption is what is called the naïve aspect of the algorithm (here, "naïve" is a technical term, not a disparagement).

The NBA module affords fast training and prediction. It can be extended to support efficient incremental training, in which new training data are used with a model already trained with previous data, without having to re-train from scratch with the previous data; and distributed training, in which the results of separate training sessions on separate collections of data are combined into a single predictive model.

Internally, the Bayes module works with categorical rather than numeric data. The data for model building needs to be discretized so as to have only categorical values.

Bayes' Theorem proves the following equation:

$$P(\text{this-prediction} | \text{this-evidence}) = \frac{P(\text{this-prediction}) \frac{P(\text{this-evidence} | \text{this-prediction})}{P(\text{this-evidence} | \text{some prediction})}}{\Sigma P(\text{some-prediction})}$$

where P means "probability of", "|" means "given", and "Σ" means "sum of". In other words, the equation says that the probability of a particular predicted event, given the evidence in this instance, is computed from three other numbers: the probability of that prediction in similar situations in general, ignoring the specific evidence (this is called the prior probability); multiplied by the probability of seeing the evidence present in a given situation, given that the particular prediction is correct; divided by the sum, for each possible prediction (including the present one), of a similar product for that prediction (i.e., the probability of that prediction in general, times the probability of seeing the current evidence given that possible prediction).

For instance, consider a pregnancy test that is good but not perfect. Let's say that 99% of specimens from pregnant persons yield a positive reaction; similarly, 99% of specimens from persons who are not pregnant yield a negative reaction. Suppose we get a positive response in a particular instance. What is the probability that the person tested is in fact pregnant (the prediction), given the positive reaction (the evidence)? By Bayes' Theorem, the answer is: the probability that the person is pregnant in the absence of any test result (the prior probability), times the probability of seeing a positive test reaction for a pregnant person (99%, by the above assumption), divided by the sum of the product just computed, plus the similar product for the non-pregnant prediction.

It may seem odd that the prior probability enters into this calculation. Why shouldn't the known accuracy of the test stand by itself? An extreme example helps illustrate why the prior probability must be included. Suppose the pregnancy test is administered to 1,000 men. According to the presumed accuracy of the test, about 10 of those men (1%) will test positive. What is the probability that they are actually pregnant? It is 0%, not 99%, despite the 99% accuracy of the test, in the sense defined above. The prior probability in this case is 0%, so the entire Bayes' Theorem expression equals zero. In less extreme examples, the prior probability may not be zero, however the previous example illustrates why it must still be taken into account.

To apply the above formula directly, we would need to tabulate P(evidence|prediction) separately for each evidence-prediction combination, with a different version for each combination of values from all the columns. Since no entire combination is likely to be duplicated exactly, such a tabulation would be infeasible. Instead, the NBA makes a simplifying assumption (the "naive" part alluded to previously). It assumes that $P(ABC \ldots | \text{this-prediction}) = P(A|\text{this-prediction})P(B|\text{this-prediction})P(C|\text{this-prediction})$ where A, B, and C are the particular values in this instance (i.e., for this row) of all the non-target columns. Thus, the assumption is that the probability of the combined pieces of evidence (given this prediction) is the product of the probabilities of the individual pieces of evidence (given this prediction). The assumption is true when the pieces of evidence work independently of one another, without mutual interference. In other cases, the assumption merely approximates the true value. In practice, the approximation usually does not degrade the model's predictive accuracy, and makes the difference between a computationally feasible algorithm and an intractable one.

From the preceding discussion, it is clear that in order to build the Naïve Bayes model, we only need to compute the prior probability of each target column value, which is the value that needs to be found, and the conditional probabilities P(X|target value) for each target value and each non-target column value X. These probabilities are computed using queries that are appropriate for a particular database.

A Structured Query Language (SQL) query for computing prior probabilities can be used as an example of how the Naïve Bayes model works. Let T be the input table containing the training data set. Let the schema of T be ($A_1$, $A_2$, . . . , $A_n$, target). The prior probability of each distinct value of the target column, $t_i$; can be computed by dividing the number of instances of $t_i$; by the total number of instances. Let N be the total number of training data records. As an example, the prior probability can be computed using the following SQL query:

insert into prior table
select 'target' as attribute name, target as value,
count(*) as prior count, count(*)/N as prior_probability
from T
group by target Referring to FIGS. 2 and 3, the process of the model builder 18 are described below. Overall, the model builder 18 generates predictive models. The model builder 18 receives training data 16 from the database 4. Training data 16 comprises a set of input values and a set of target values. Theoretically, input variables should be statistically independent of each other but practically this is not always possible. Each column of training data 16 can contain either numerical data or categorical data. Numerical data contains numbers, and is ordered according to the magnitude of each value. Categorical data comprises a list of different classes of data that have no numeric values. This data is essentially unordered. The values of all of the input variables need not be known to make a prediction. Target variables are the predicted outcomes.

The present invention performs both classification and regression. These are two of the most common problems that a data mining tool 8 can model. Classification and regression represent the largest body of problems to which data mining is applied, creating models to predict class membership (classification) or a value (regression). When the model builder 18 is supplied with continuous data 3, the data 3 values must be discretized or binned into ranges. These ranges are highly important because they significantly affect the quality of the model.

In most operating systems, there is a one-to-one relationship between the task and the program, but some operating systems allow a program to be divided into multiple tasks. Such systems are called multithreading operating systems. A thread—sometimes called an execution context or a lightweight process—is a single sequential flow of control within a program. A thread itself is not a program; it cannot run on its own. Rather, it runs within a program. A thread is similar to a real process in that a thread and a running program are both a single sequential flow of control. However, a thread is considered lightweight because it runs within the context of a full-blown program and takes advantage of the resources allocated for that program and the program's environment. As a sequential flow of control, a thread must carve out some of its own resources within a running program. (It must have its own execution stack and program counter for example.) The code running within the thread works only within that context. A thread may also be referred as a lightweight process or as an execution context.

A thread is a semi-process, which has its own stack, and executes a given piece of code. Unlike a real process, the thread normally shares its memory with other threads (where as for processes we usually have a different memory area for each one of them). A Thread Group is a set of threads all executing inside the same process. They all share the same memory, and thus can access the same global variables, same heap memory, same set of file descriptors, etc. All these threads execute in parallel (i.e. using time slices, or if the system has several processors, then really in parallel).

The advantage of using a thread group instead of a normal serial program is that several operations may be carried out in parallel, and thus events can be handled immediately as they arrive (for example, if we have one thread handling a user interface, and another thread handling database queries, we can execute a heavy query requested by the user, and still respond to user input while the query is executed).

The advantage of using a thread group over using a process group is that context switching between threads is much faster then context switching between processes (context switching means that the system switches from running one thread or process, to running another thread or process). Also, communications between two threads is usually faster and easier to implement then communications between two processes. On the other hand, because threads in a group all use the same memory space, if one of them corrupts the contents of its memory, other threads might suffer as well. With processes, the operating system normally protects processes from one another, and thus if one corrupts its own memory space, other processes won't suffer. Another advantage of using processes is that they can run on different machines, while all the threads have to run on the same machine (at least normally).

The present invention incorporates a multi-threaded implementation of the Naïve Bayes learning algorithm into an enterprise server. An enterprise server is a server that is intended to serve a large number of users. The present invention is designed to perform data mining on large amounts of data, for example, millions of rows by thousands of columns or data. Categorical attributes of the data 3 may be divided into more generic groups to reduce the number of distinct values.

The present invention supports four methods for analyzing data 3. The first is batch learning, which involves processing all the training data 16 at once. The second is incremental learning, which processes predetermined groups of data 3 at different times. This type of processing will yield a useful end result that incorporates each group of data. However the processing of each group of data 3 can also yield useful information. Data 3 can also be processed one set of training data 16 at a time. This method is referred to as online learning, and can yield useful information from each individual set of training data 16 as well as from combining the individual sets. Lastly, there is distributed learning. In this method, groups of data 3 are processed separately. This processing can occur simultaneously, or at different times. This type of processing can also occur in different locations, for example, within separate databases. The result of the processing in each location results in a Naïve Bayes model. The results of this method can be both individually useful, and can be combined into a single, more accurate result.

Referring to FIG. 3, the model builder 18 starts building a model by calculating the prior probability of each target value 22; this is done by first computing the number of times the target value occurs in the training data set 16. The prior probability is the number of times the target variable occurs in training data 16 divided by the total amount of training data 3. For example, if a target value occurs 7 times in a total of 10 times, the prior probability is 0.7.

Next, the model builder 18 calculates the frequency of each input variable 24. The frequency is the number of times the independent value occurs in combination with each target variable. The frequency is stored with the input value as pair-wise data 3; this pair-wise data 3 is called a count.

Then the model builder 18 analyzes the effect of the input variables on the target values to calculate conditional probabilities 26. The conditional probabilities are created by analyzing the frequencies. The conditional probabilities are also computed and stored along with the pair-wise counts.

The present invention uses the Naïve Bayes model to maintain two sets of data. These are referred to as raw counts, and probabilities. Raw counts are comprised of columns and rows of data. The probability set refers to the probability of having a particular set of data occur. This data is computed by dividing the number of simultaneous occurrences of predetermined data by the total number of data present. The present invention uses this probability data to perform predictions on new data 3. These probabilities must be recomputed if the underlying raw counts are revised. A model may be monitored to verify its continued relevance. This may be accomplished by supplying the scoring function 20 with a set of data 3 that has known patterns and known relationships.

Although the invention has been described with reference to particular embodiments, it will be understood to those skilled in the art that the invention is capable of a variety of alternative embodiments within the spirit of the appended claims.

What is claimed is:

1. A computer-implemented data mining server, comprising:
   a database containing data;
   a database engine operatively connected to process said data;
   a multi-threaded classification system, said classification system using said data to perform classification based on a Naive Bayes model, wherein said classification system comprises a batch learning system, an incremental learning system, an online learning system, and a distributed learning system; and
   a multi-threaded regression system, said regression system using said data to perform regression based on a Naive Bayes model, wherein said regression system comprises a batch learning system, an incremental learning system, an online learning system, and a distributed learning system.

2. The data mining server according to claim 1, wherein said classification and regression systems comprise developing a set of rules from a set of training data.

3. The data mining server according to claim 1, wherein said Naive Bayes model comprises:

$$P(\text{this-prediction}|\text{this-evidence}) = \frac{P(\text{this-evidence}|\text{this-prediction})}{\Sigma P(\text{some-prediction})} \cdot P(\text{this-evidence}|\text{some prediction})$$

4. The data mining server according to claim 1, wherein said Naive Bayes model further comprises:

$$P(ABC\ldots|\text{this-prediction}) = P(A|\text{this-prediction})P(B|\text{this-prediction})P(C|\text{this-prediction}).$$

5. A computer-implemented method for performing data mining, comprising:
   receiving data from a database;
   performing multi-threaded classification on said data based on a Naive Bayes model by processing said data according to a batch learning system, processing said data according to an incremental learning system, processing said data according to an online learning system, and processing said data according to a distributed learning system; and
   performing multi-threaded regression on said data based on a Naive Bayes model by processing said data according to a batch learning system, processing said data according to an incremental learning system, processing said data according to an online learning system, and processing said data according to a distributed learning system.

6. The method according to claim 5, wherein said performing multi-threaded classification and regression comprises developing a set of rules from a set of training data.

7. The method according to claim 5, wherein said Naive Bayes model comprises:

$$P(\text{this-prediction}|\text{this-evidence}) = \frac{P(\text{this-evidence}|\text{this-prediction})}{\Sigma P(\text{some-prediction})} \cdot P(\text{this-evidence}|\text{some prediction})$$

8. The method according to claim 5, wherein said Naive Bayes model further comprises:

$$P(ABC\ldots\text{this-prediction}) = P(A|\text{this-prediction})P(B|\text{this-prediction})P(C|\text{this-prediction}).$$

9. A computer program product stored in a memory for performing data mining, comprising:
   a database containing data;
   a database engine operatively connected to process said data;
   a multi-threaded classification system, said classification system using said data to perform classification based on a Naive Bayes model, wherein said classification system comprises a batch learning system, an incremental learning system, an online learning system, and a distributed learning system; and
   a multi-threaded regression system, said regression system using said data to perform regression based on a Naive Bayes model, wherein said regression system comprises a batch learning system, an incremental learning system, an online learning system, and a distributed learning system.

10. The computer program product according to claim 9, wherein said classification and regression systems comprise developing a set of rules from a set of training data.

11. The computer program product according to claim 9, wherein said Naive Bayes model comprises:

$$P(\text{this-prediction}|\text{this-evidence}) = \frac{P(\text{this-evidence}|\text{this-prediction})}{\Sigma P(\text{some-prediction})} \cdot P(\text{this-evidence}|\text{some prediction})$$

12. The computer program product according to claim 9 wherein said Naive Bayes model further comprises:

$$P(ABC\ldots\text{this-prediction}) = P(A|\text{this-prediction})P(B|\text{this-prediction})P(C|\text{this-prediction}).$$

* * * * *